June 21, 1932.  R. B. NORTH ET AL  1,863,696
HYDRAULIC DIGGER AND LOADER
Filed June 15, 1928  6 Sheets-Sheet 1
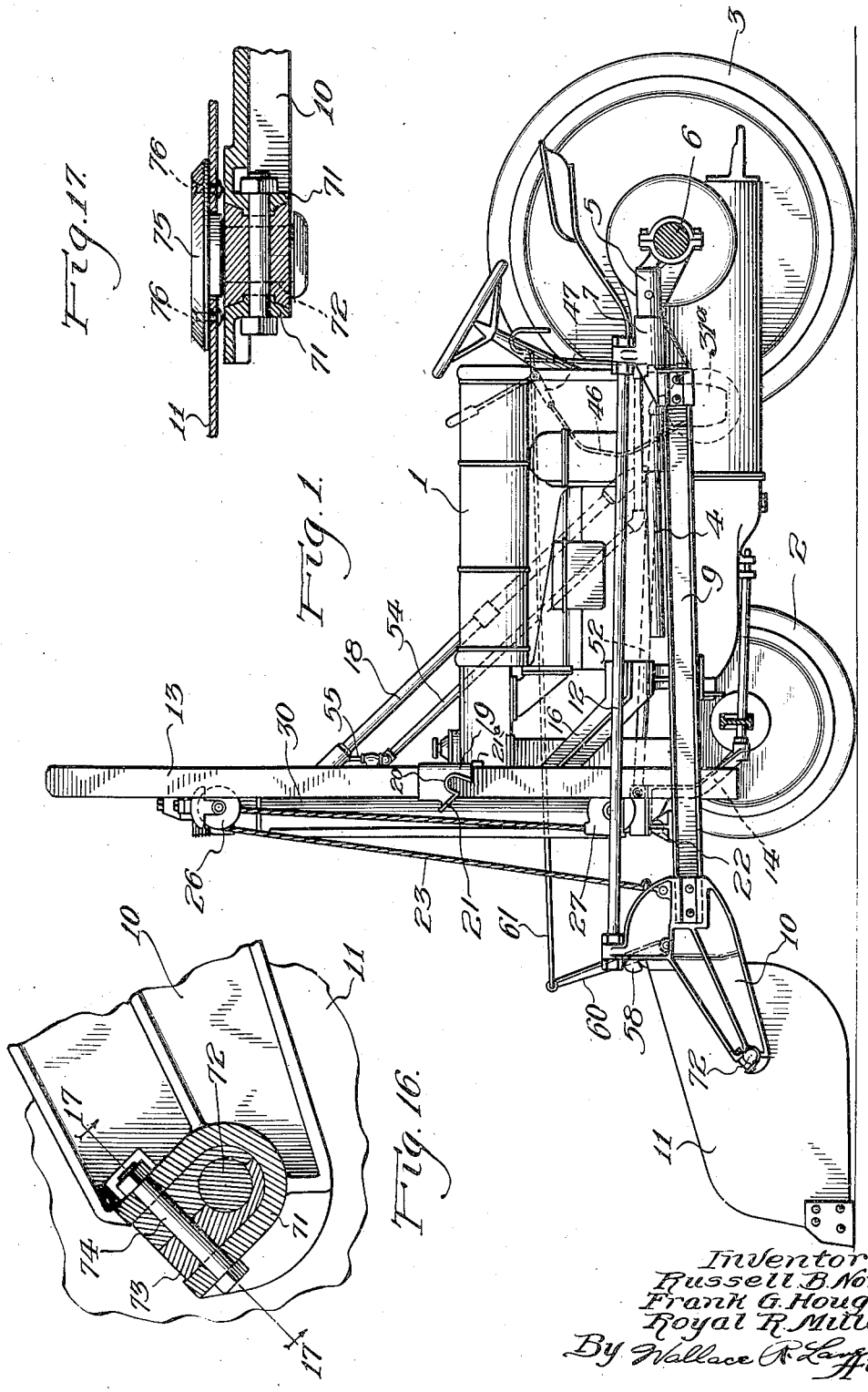
Inventors:
Russell B. North,
Frank G. Hough,
Royal R. Miller.
By Wallace R. Lane Atty.

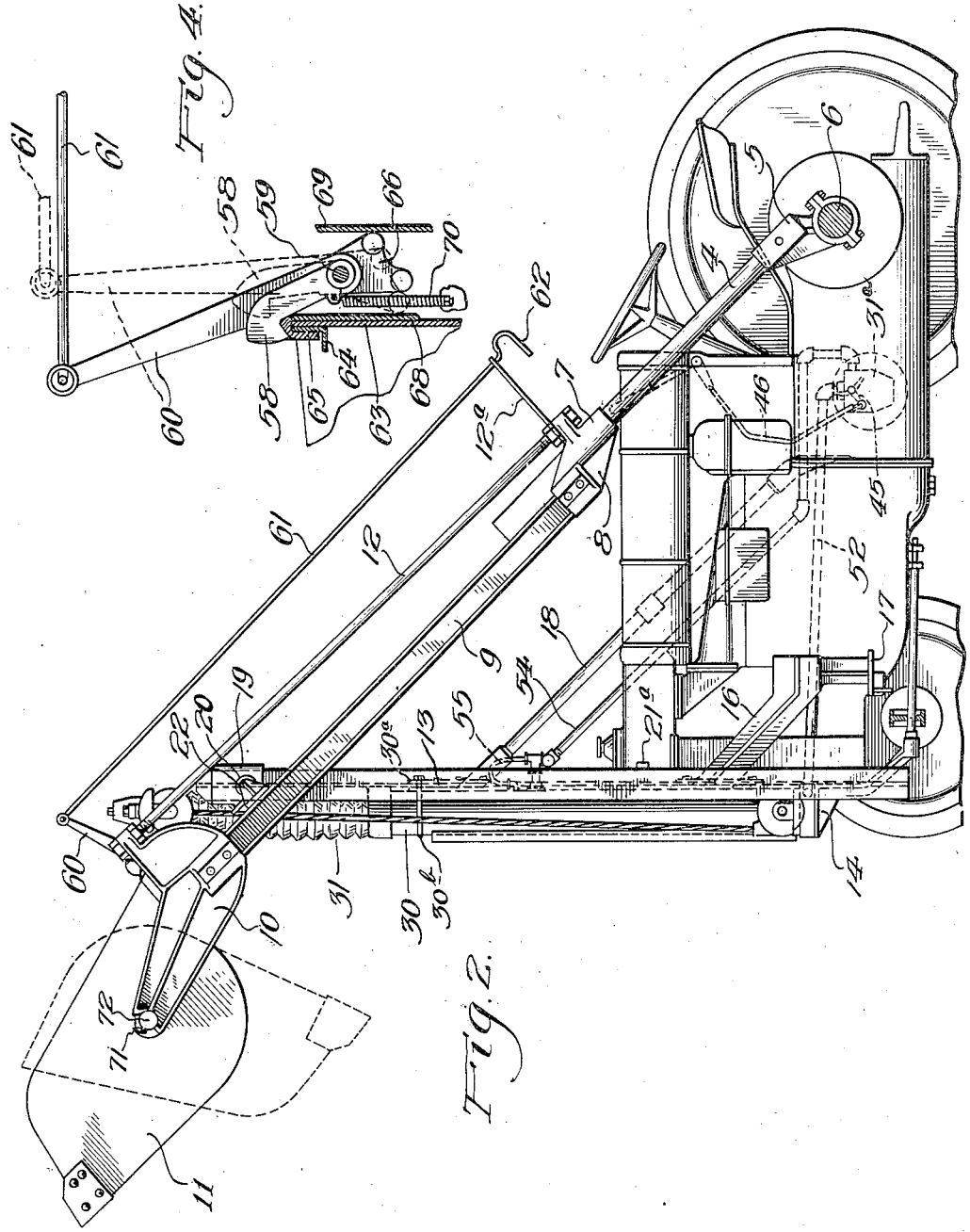

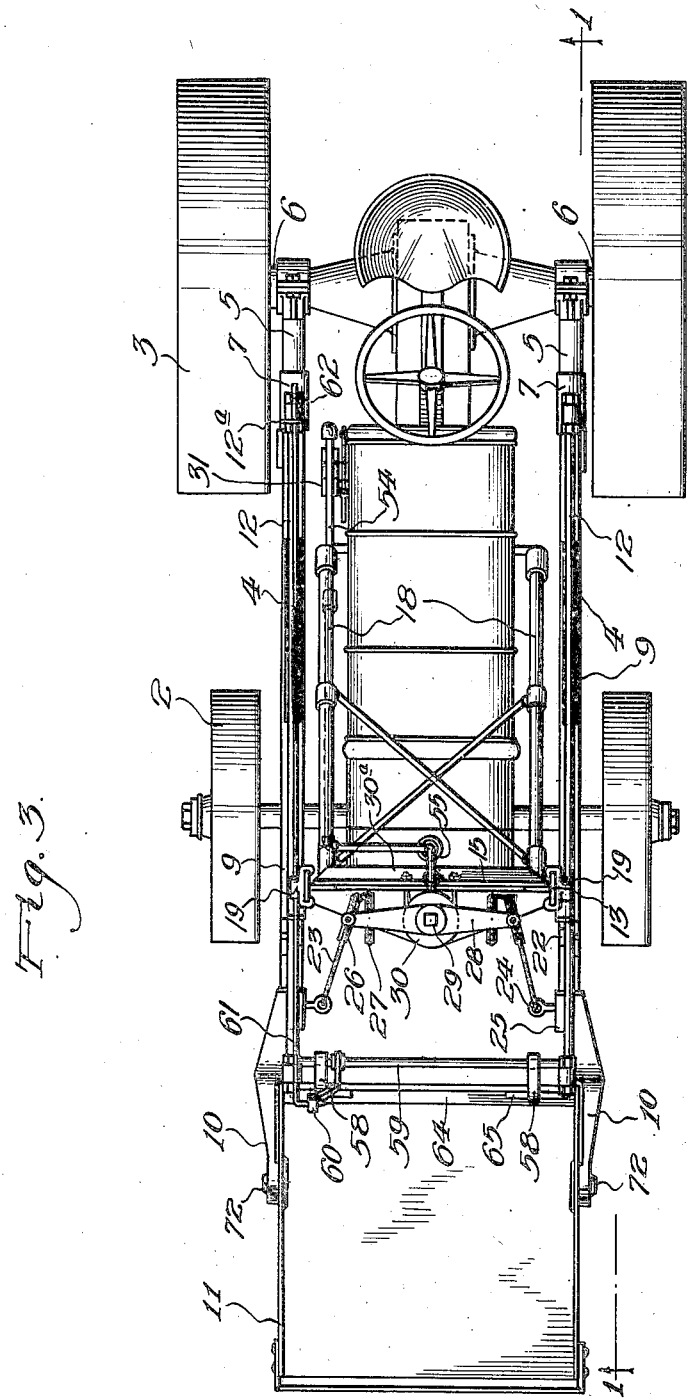

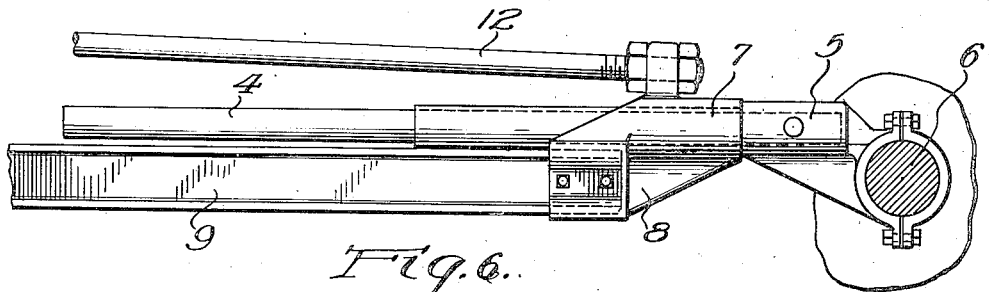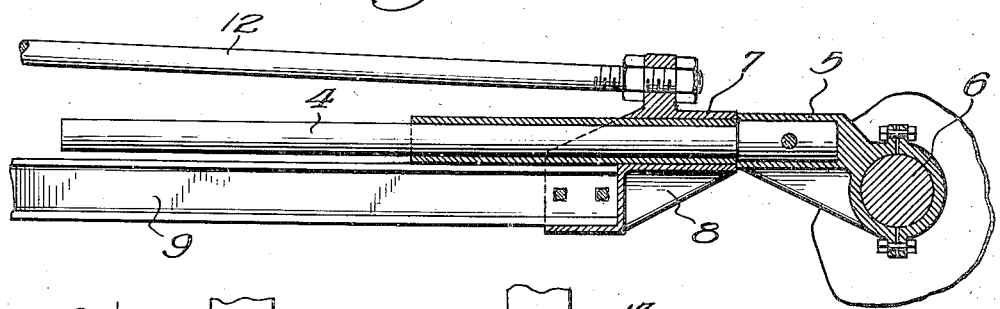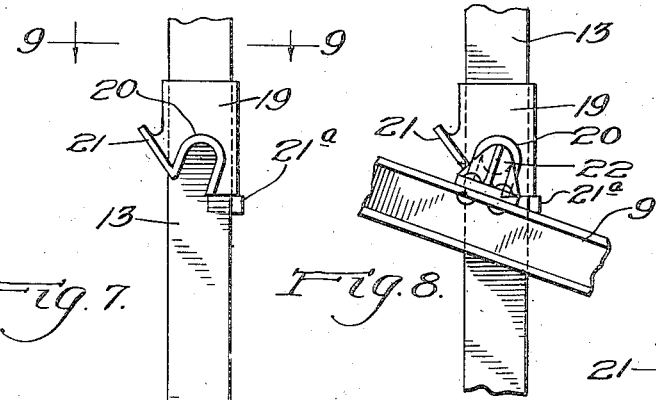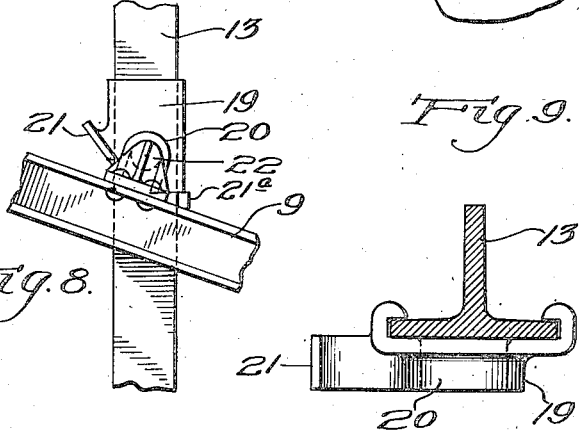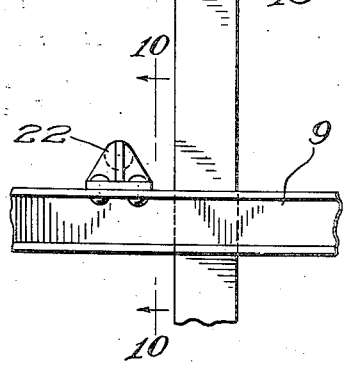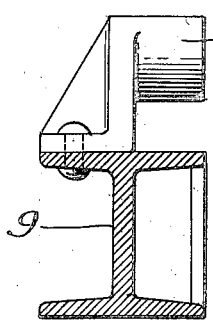

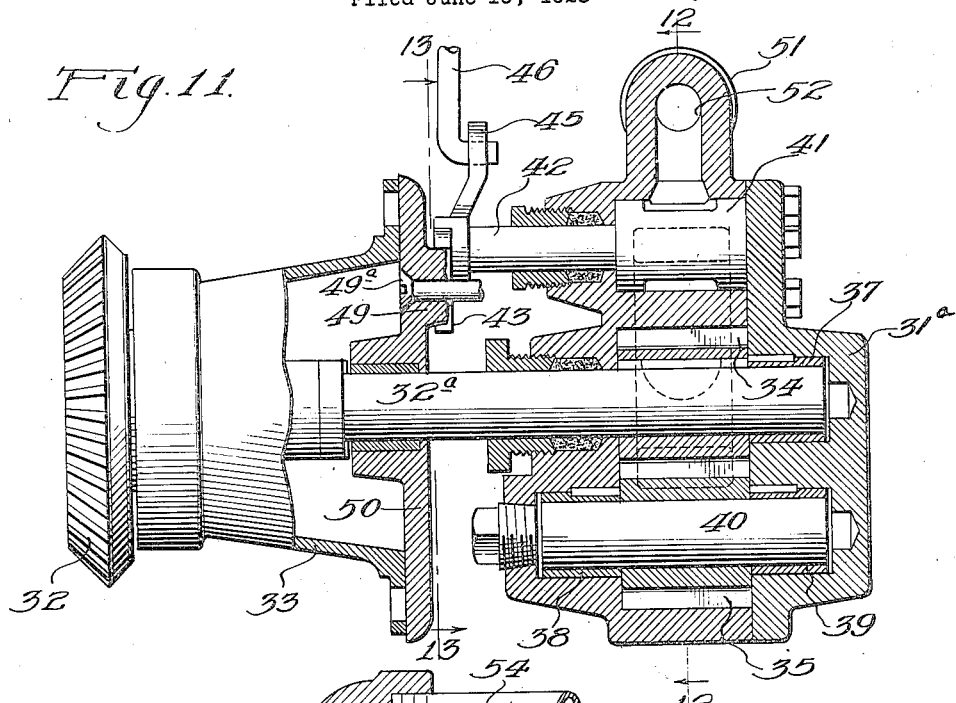
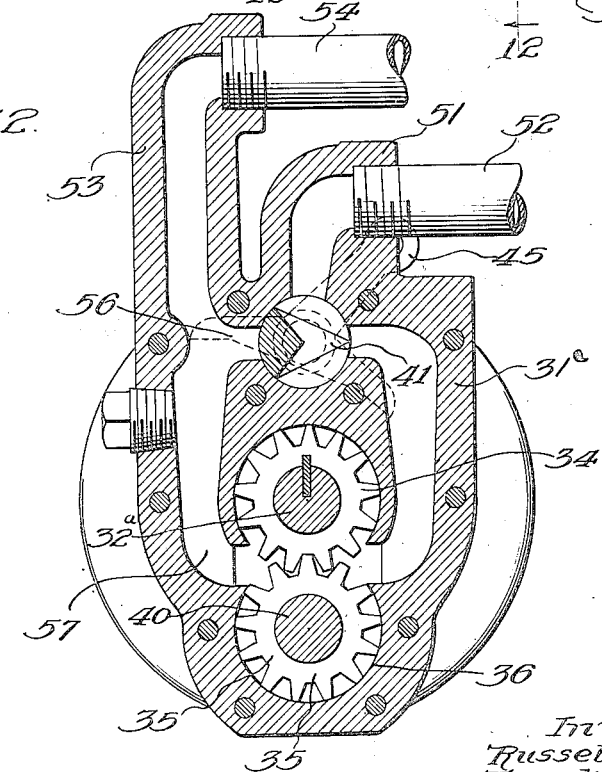

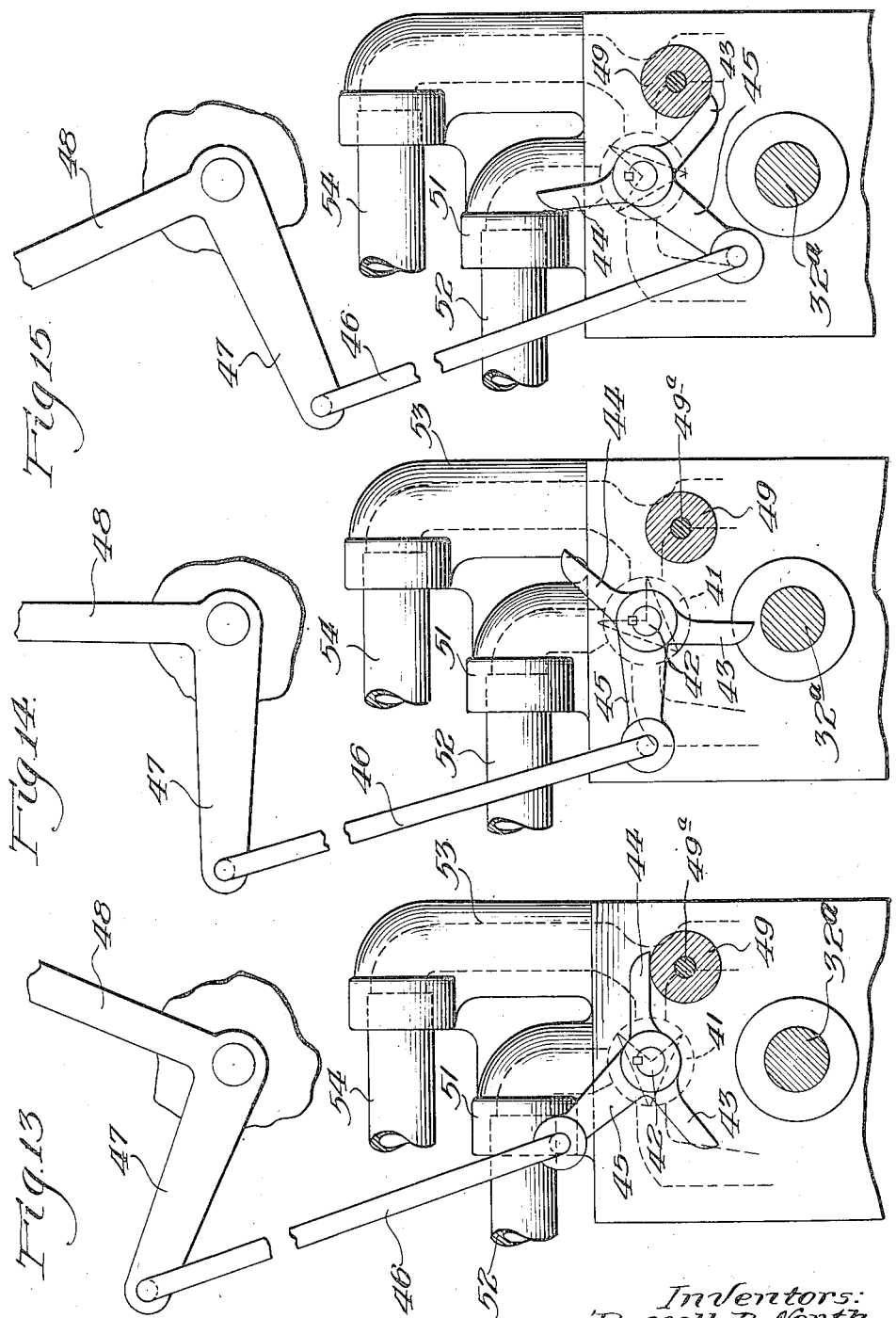

Patented June 21, 1932

1,863,696

UNITED STATES PATENT OFFICE

RUSSELL B. NORTH, FRANK G. HOUGH, AND ROYAL R. MILLER, OF CHICAGO, ILLINOIS, ASSIGNORS TO WILLIAM MITCHELL BLAIR, OF CHICAGO, ILLINOIS

HYDRAULIC DIGGER AND LOADER

Application filed June 15, 1928. Serial No. 285,698.

This invention relates to hydraulic diggers and loaders, and more particularly to the provision of such a construction adapted for attachment with a tractor, and adapted to lift material to a relatively great altitude, or to intermediary positions.

Among the objects of our invention are to provide a hydraulic digger and loader of novel construction and adapted to be readily operated by the operator of the tractor; further to provide a novel construction of lifting means for said digger and loader; further to provide a novel construction of hydraulic valve mechanism for lifting, lowering and holding the mechanism and scoop or shovel in various positions; further to provide a hydraulic digger and loader of maximum simplicity, efficiency, economy and ease of operation; and such further objects, advantages and capabilities as will later more fully appear.

Our invention further resides in the combination, construction and arrangement of parts illustrated in the accompanying drawings, and while we have shown therein a preferred embodiment, we desire it to be understood that the same is susceptible of modification and change without departing from the spirit of our invention.

In the drawings:

Fig. 1 is a vertical cross sectional view on line 1—1 of Fig. 3, and disclosing our hydraulic digger and loader as combined with a tractor.

Fig. 2 is a view similar to Fig. 1, but disclosing the lifting mechanism and bucket or shovel in its raised position.

Fig. 3 is a top plan view of the entire mechanism.

Fig. 4 is a fragmentary view in detail of the latch mechanism for locking and unlocking the bucket or shovel.

Fig. 5 is a fragmentary enlarged view of the telescopic sleeve.

Fig. 6 is a vertical cross sectional view of Fig. 5.

Fig. 7 is a fragmentary enlarged view of the guide slide when the bucket or shovel is in the lower position shown in Fig. 1.

Fig. 8 is a fragmentary enlarged view of the catch guide slide shown in Fig. 7, but showing the same in engagement with the lug on the boom, the bucket or shovel being in partially raised position.

Fig. 9 is a horizontal cross sectional view on the line 9—9 of Fig. 7.

Fig. 10 is a vertical cross sectional view on the line 10—10 of Fig. 7.

Fig. 11 is a cross sectional view of the valve mechanism but showing a portion thereof in side elevation.

Fig. 12 is a vertical cross sectional view on the line 12—12 of Fig. 11.

Fig. 13 is a vertical cross sectional view on the line 13—13 of Fig. 11, and showing the valve mechanism in the lifting position.

Figs. 14 and 15 are similar views to Fig. 13, but disclosing the valve mechanism in the lowering and holding positions respectively.

Fig. 16 is a fragmentary view in side elevation of the means of detaching the bucket or scoop.

Fig. 17 is a fragmentary cross sectional view taken on the line 17—17 of Fig. 16.

Referring to the drawings, the numeral 1 designates generally a tractor provided with front steerable wheels 2 and rear driving wheels 3. Our novel construction of hydraulic digger and loader is adapted to be applied to the ordinary tractor and this construction is clearly disclosed in Figs. 1, 2 and 3 of the drawings.

The booms for raising the bucket comprise a tubular arm 4 rigidly secured to a casting 5, which casting in turn is pivotally mounted upon the rear axle 6 of the tractor. Slidably mounted on the arm 4 is a sleeve 7 having a bracket 8 rigidly secured to an H-beam 9 forming the forward portion of the boom. The front and of the membr 9 is secured to the bucket bracket 10 for holding the bucket or scoop 11. One of these booms are attached to the opposite sides of the tractor. A brace member 12 is attached to an upwardly extending arm 12ª on the bracket 7 and to the bucket bracket 10. By the construction of the boom, the entire thrust in digging and loading position is taken directly against the axle without any strain upon the remaining members of the mechanism.

Mounted on the opposite sides of the forward end of the tractor are vertical T-beams 13 attached to a cylinder bracket 14 at their lower end and to a plate 15 at their upper end. Knee brackets 16 are further provided for bracing the upright beams, which knee brackets are in turn attached to an under bracket 17 passing beneath the power plant of the tractor and attached thereto. Diagonal brace rods 18 are attached to the housing of the power plant at their lower end and to the flanges of the upright T-beams at their upper end.

The construction of bracing means and diagonal bracing rods provides a rigid construction and holds the upright members in fixed position. Slidably mounted on the upright members are provided boom guide slides 19. These slides are provided with a cut-out portion having an outwardly extending flange 20 and an angular flange 21 and are limited in their downward movement by means of stops 21ª. These guides 19 are adapted to be engaged by arcuate projections 22 mounted upon the upper flange of the H-beams 9.

A cable 23 is attached by means of eyes 24 to the inwardly extending portions 25 of the bracket 10. These cables pass over an upper pulley 26 and then over a lower pulley 27 and the upper end of the cable is then attached to a cross head 28, thus providing a three part line for increasing the speed of lift of the bucket. This cross head 28 is mounted on the upper end of piston rod 29 of a piston (not disclosed) mounted in the cylindrical casing 30. The lower portion of the cylinder 30 is mounted in the bracket 14 and its upper end is braced by means of a plate 30ª provided with a U-bolt 30ᵇ passing around cylinder or casing 30. The piston rod is enclosed and protected from the grit and dirt by means of a collapsible canvas boot 31.

The means and method of raising the bucket or scoop from its lower to its raised position, comprises a pump 31ª of any suitable construction. This pump is driven direct from the tractor power take-off and runs at engine or power plant speed. The means for driving the pump is more clearly disclosed in Fig. 11 and comprises a bevel gear 32 adapted to mesh with a bevel gear of a power take-off of the tractor. This bevel gear is mounted upon a shaft 32ª passing through a housing 33 and into the gear pump 31ª.

Mounted within the pump and directly upon the shaft 32ª is a gear 34 keyed to the shaft as shown clearly in Fig. 12. The gear 34 in turn meshes with and drives a similar gear 35 mounted in the well 36 of the pump. A bushing 37 for the shaft 32 is keyed to the outer casing of the gear pump, while bushings 38 and 39 for the shaft 40 are also keyed to the outer casing, thus preventing any rotation of the bearings or bushings.

A valve 41 is mounted in the upper portion of the gear casing. This valve is located directly in the outlet of the gear pump. The means for operating the valve 41 and thus controlling the outlet from the pump, comprises a shaft 42 provided on the outside of the casing with a pair of fingers 43 and 44. These fingers are mounted on a bell crank 45, which in turn is connected to an arm 46 pivotally connected to an extension 47 of a lever 48. Figs. 13, 14 and 15 of the drawings disclose the lever arm 46 as substantially straight, although in general practice this arm is bent as more clearly disclosed in Figs. 1, 2 and 3, which figures show the mechanism in assembled relation. Lugs 49 are mounted on the side wall 50 of the casing 33, and provides an abutting surface for the fingers 43 and 44 of the valve member and also provides the range of movement of the valve. But one of these lugs is necessary for providing the abutting means, although in actual construction three of these lugs are spaced apart on the surface of the casing and countersunk bolts 49ª pass through these lugs and into projections on the gear housing for holding this housing in position. The outlet from the gear pump is designated generally as 51, the fluid passing from this outlet 51 to the intake of the cylinder 30 by means of a pipe line 52. The intake to the gear pump or drain from the cylinder 30 is designated at 53, the fluid flowing back from the cylinder into the gear casing by means of a pipe line 54. A by-pass 55 is provided above the outlet from the cylinder and comprises a U-shaped tube of smaller cross section which joins with the pipe line 54 near its upper end.

Figs. 12 and 13 disclose the valve 41 in its lifting position. A port 56 from the inlet 53 to the outlet 51 is closed by the valve and thus the fluid has to pass through the lower chamber 57 and gears 34 and 35, the fluid being placed under pressure by the gears. In Fig. 14, the valve is shown in lowering position, both the inlet and outlet being disclosed as partially opened by the valve. In Fig. 15, is disclosed the valve in holding position, the valve being shown as closing the outlet port 51 so that no fluid may escape through this outlet, and thus holding the bucket or scoop at any desired position. In these Figs. 13, 14 and 15, the hand control lever 48 is disclosed in the various positions that it occupies according as to whether the operator desires a lifting, lowering or holding position, respectively. When it is desired to lift the bucket and its load, the lever arm is pulled to the rear. Should it be desired to lower the bucket, the hand controlled lever is placed in a vertical position. When the operator desires to hold the bucket in its position, the hand controlled lever is pushed forwardly.

In order to trip the bucket or scoop when desired, we provide a latching or tripping mechanism including a pair of latches 58 mounted upon a shaft 59 suitably journaled on the opposite sides of the bracket 10 of the bucket. A lever arm 60 is mounted upon the shaft 59 and is attached at its upper end to a rod 61 journalled in the arm 12ª having a handle 62. Mounted on the interior wall 63 of the bucket is an angle iron 64 and mounted in turn upon this angle iron is a latch plate 65 having an angularly disposed upper surface adapted to be engaged by the latches 58. The lower end 66 of the lever arm 60 is adapted to impinge against a plate 68 mounted on the rear of the bucket, whenever the handle 62 is operated to disengage the latches from the bucket, while a plate 69 of the bracket assembly 10 is impinged against by this lower end 66 whenever the latches are in holding engagement, these plates determining the range of movement of the lever arm 60.

Springs 70 attached to the bracket assembly and to the lever arm 60, normally hold the latches in engagement with the bucket, although these springs do not prevent the ready disengagement of the latches from the latch plate by the operator.

In order that the bucket may be readily disengaged from the brackets 10, I provide a detachable, pivoted support. The detaching means is clearly disclosed in Figs. 16 and 17 of the drawings. In this construction, the opposite brackets 10 are provided with U-shaped cut-outs 71 which provide a bearing for the stub shafts 72 mounted on and providing a pivotal support for the bucket. The members 71 are further provided with an inwardly extending shoulder adapted to engage with a centrally disposed groove in the split bushings 73. The split bushings are provided with extensions having openings aligned with openings in the U-shaped bearing members 71. A bolt 74 is adapted to be passed through the openings and to hold the split bushings in position. Plates 75 are securely attached to the inner side walls of the bucket 11, and are mounted upon the inner end of the shafts 72. In order that there may be no projections upon the plate 75, the rivets or other securing means 76 are countersunk, thus providing a flush surface with the face of the plate.

In initial or loading operation, the bucket is generally lowered in the position shown in Fig. 1 of the drawings, although our construction is suitably adapted to operate at any suitable height above the level of the ground on which the tractor is being operated. This operative range in height is generally about four feet above the ground, or more particularly at an altitude not to exceed that of the lower position of the slide 19, the reason being that up to this point, the entire thrust is on the rear axle and not on the boom or vertical members 13.

When it is desired to raise the bucket and its contents, the gear pump is operated, the valve being placed in the position shown in Figs. 12 and 13 of the drawings for forcing the fluid under pressure, through the outlet 51 to the inlet at the base of the cylinder 30, thus forcing upwardly the piston in the cylinder 30. The bucket and arcuate lugs will then be swung through an arc until the lugs 22 engage with the slides 19. Thereafter, as the bucket is being raised, the arcuate lugs will no longer be raised through an arc, but rather vertically, the H-beam 9 of the boom being drawn forwardly by means of the slide 7 on the member 4. When the bucket has been raised to the altitude desired, the operator, by means of the hand control lever 48 causes the valve in the gear pump to assume the position shown in Fig. 15 of the drawings, and thus hold the bucket and its contents in the desired position. The operator then pulls upon the handle 62 disengaging the trip mechanism from the bucket and allowing the bucket to assume the position shown in the dotted outline of Fig. 2 for discharging its contents. The operator next lowers the bucket by moving the hand control lever to a vertical position and causing the valve of the gear pump to assume the position shown in Fig. 14 of the drawings. As the bucket touches the ground, it is tilted upwardly and the latches will engage the rear edge of the bucket for holding it in normal operative position.

Although we propose to use oil as our hydraulic fluid or medium, we do not desire to be limited by any particular fluid in the operation of our mechanism.

Having thus disclosed the invention, we claim:—

1. In a hydaulic digger and loader mounted on a tractor, telescoping booms positioned at the opposite sides of said tractor and mounted on the rear axle of said tractor, means for extending said booms upon a raising of the same, and a bucket mounted on the forward ends of said booms.

2. In a hydraulic digger mounted on a tractor and provided with a bucket, castings adapted to encircle the rear axle of said tractor, telescoping booms positioned at the opposite sides of said tractor and carried by said castings, the rear axles taking the entire thrust of the bucket and booms during the digging operation, and means for extending said booms upon a raising of the same.

3. In a hydraulic digger and loader adapted for attachment to a tractor, booms positioned at the opposite sides of the tractor and rotatably mounted on the rear axle of said tractor, the forward ends of said booms being provided with brackets for holding a bucket, vertical beams mounted on the opposite sides of said tractor, slides positioned on said vertical beams, and lugs mounted near the forward end of said booms and adapted to engage said slides when the booms are being raised.

4. In a hydraulic digger and loader mounted upon a tractor and provided with a bucket, telescoping booms positioned at the opposite sides of said tractor, said booms being mounted upon the rear axle of said tractor, vertical beams mounted on the opposite sides of said tractor, guide slides positioned on said vertical beams, a stop mounted on said beams for limiting the downward movement of said slides, and lugs mounted on said booms near the forward end thereof and adapted to engage said slides as the booms are being raised to discharge the contents of the bucket.

5. In a digger and loader mounted upon a tractor, telescoping means positioned at the sides of said tractor, a bucket positioned at the ends of said means, hydraulic means for raising said bucket and means for extending said telescoping means as the bucket is being raised.

6. In a digger and loader mounted upon a tractor, telescoping booms positioned at the side walls of said tractor, a bucket mounted on said booms, vertical beams mounted on the side walls of said tractor for guiding said booms, an hydraulic pump directly driven from the power take-off of said tractor, hydraulic means operated by said pump, and a three-part cable operatively connecting said hydraulic means and booms for raising said booms and bucket.

7. In a hydraulic digger adapted to be mounted on a tractor, telescoping booms mounted on said tractor, a bucket mounted on the forward end of said booms, upright members mounted on the forward end of said tractor, and means associated with said booms and members for extension of said booms.

8. In a hydraulic digger adapted to be mounted on a tractor, telescoping booms mounted on the rear axle of said tractor, a bucket mounted on the forward end of said booms, upright members mounted on the forward end of said tractor, slidable means on said members, and means connected to said booms and adapted to engage said slidable means for extension of said booms when the same are being raised.

9. In a hydraulic digger adapted to be mounted on a tractor, castings mounted on the rear axle of said tractor, telescoping booms on opposite sides of said tractor and provided with a bucket at their forward ends, said booms adapted to contact and abut said castings for transmitting the entire thrust of the bucket and booms to said axle during the digging operation, and means for guiding and extending said booms when the same are being raised.

10. In a hydraulic digger adapted to be mounted on a tractor, telescoping booms mounted on said tractor whereby any thrust on said booms is transmitted direct to the tractor, a bucket mounted on the forward end of said booms, and means associated with said booms for extension thereof upon a raising of the same and for elevating said bucket substantially vertically.

11. In a hydraulic digger adapted to be mounted on a tractor, telescoping booms mounted on said tractor, said booms comprising elongated members adapted to seat one within the other, a bucket mounted on said booms, said members seating for transmitting the thrust of the bucket to said tractor when the same is lowered and during the digging operation, and means for raising and lowering said bucket.

12. In a hydraulic digger adapted to be mounted on a tractor, telescoping booms mounted on said tractor, said booms comprising elongated members adapted to seat one within the other, a bucket mounted on said booms, said members seating for transmitting the thrust of the bucket to said tractor when the same is lowered and during the digging operation, and means for effecting an extension of said booms upon a raising of the same.

13. In a hydraulic digger adapted to be mounted on a tractor, telescopic booms mounted on said tractor and comprising elongated members slidable one within the other, a bucket mounted on said booms, one of said members provided with a collar adapted to contact and seat with the other of said members whereby the thrust of said bucket is transmitted to said tractor during the digging operation, and means for raising and lowering said bucket.

14. In a hydraulic digger adapted to be mounted on a tractor, telescopic booms mounted on said tractor and comprising elongated members, a bucket mounted on said booms, a sleeve mounted on one of said members, the other of said members being slidable in said sleeve and provided with a collar adapted to seat with said sleeve whereby the thrust of said bucket is transmitted to said tractor during the digging operation, and means for raising and lowering said bucket.

15. In a hydraulic digger adapted to be mounted on a tractor, booms mounted on each side of said tractor, a bucket mounted on the forward end of said booms, vertical members mounted on the forward end of said tractor, and hydraulic means including a casing secured to said members for raising and lowering said booms and bucket.

16. In a hydraulic digger adapted to be mounted on a tractor, booms mounted on each side of said tractor, a bucket mounted on the forward end of said booms, vertical members secured to the forward end of said tractor, a casing mounted on said tractor and secured to said members, and a hydraulically operated cross-head in said casing connected with said booms and bucket for raising and lowering the same.

17. In a hydraulic digger adapted to be mounted on a tractor, telescopic booms mounted on each side of said tractor, a bucket mounted on the forward end of said booms, vertical members secured to the forward end of said tractor, means on said members for effecting an extension of said booms upon a raising of the same, a casing secured to said members, and hydraulically operated means in said casing for raising and lowering said booms and bucket.

18. In a hydraulic digger adapted to be mounted upon a tractor, telescopic booms mounted on the sides of said tractor, a bucket mounted on said booms, and hydraulic means mounted on the front end of said tractor for raising and lowering said bucket.

19. In a hydraulic digger adapted to be mounted upon a tractor, telescopic booms mounted on the sides of said tractor, a bucket mounted on said booms, and hydraulic means including a hydraulically operated crosshead operatively connected with said booms and bucket for raising and lowering the same.

20. In a hydraulic digger adapted to be mounted upon a tractor, telescopic booms mounted on the sides of said tractor, a bucket mounted on said booms, hydraulic means including a cylindrical casing mounted on the front of said tractor, and a cross-head in said casing and hydraulically operated for raising and lowering said booms and bucket.

21. In a hydraulic digger adapted to be mounted on a tractor, telescopic booms mounted on the sides of said tractor, a bucket mounted on the forward end of said booms, vertical members mounted on the front of said tractor, means on said members for guiding said booms, and hydraulic means including a casing secured to said members for raising and lowering said booms and bucket.

22. In a hydraulic digger adapted to be mounted on a tractor, telescopic booms mounted on the sides of said tractor, a bucket mounted on the forward end of said booms, vertical members mounted on the front of said tractor, means movably mounted on said members for guiding and effecting an extension of said booms upon a raising of the same, and hydraulic means including a casing secured to said members for raising and lowering said booms and bucket.

In witness whereof, we hereunto subscribe our names to this specification.

RUSSELL B. NORTH.
FRANK G. HOUGH.
ROYAL R. MILLER.